March 8, 1960    E. SCHOLZ    2,927,574
ENDOSCOPE FOR THE OBSERVATION OF VENTRICLES
OF THE BODY OR THE LIKE
Filed May 16, 1955    2 Sheets-Sheet 1
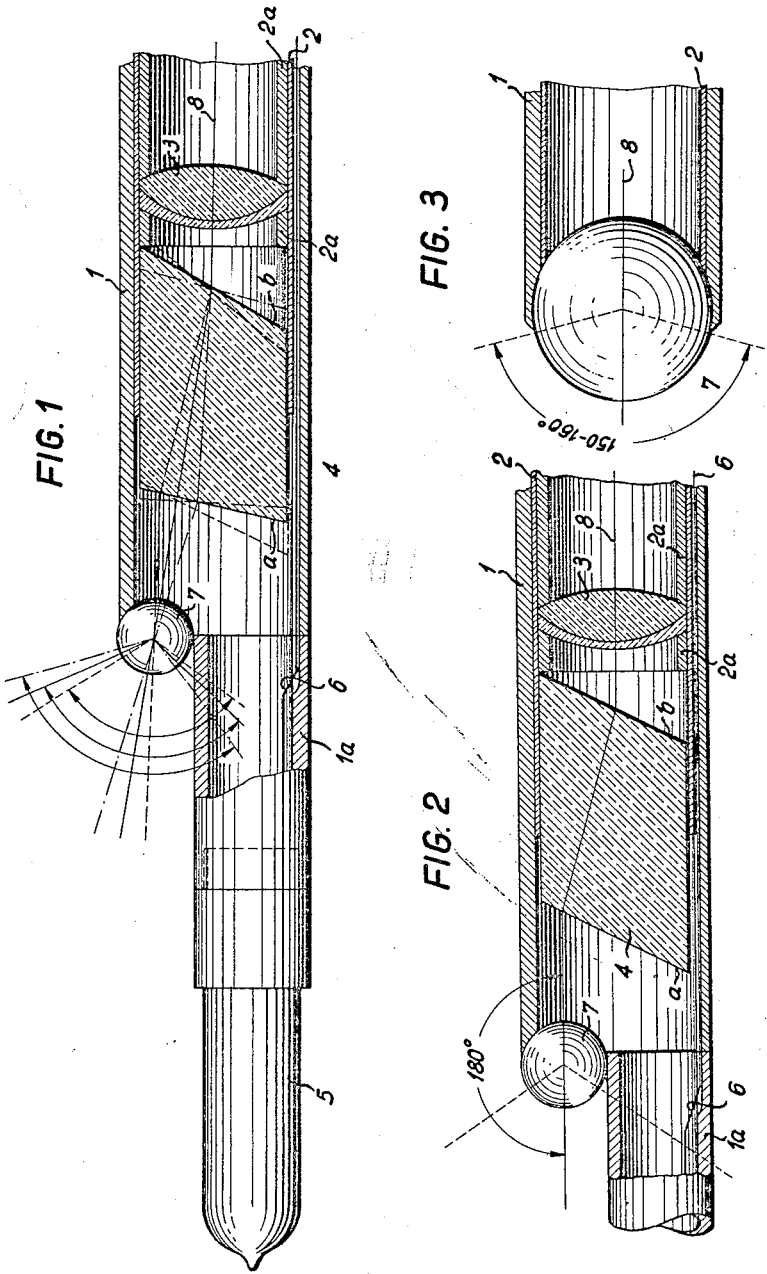
INVENTOR:
ERWIN SCHOLZ
by
Richardson, David and Nordon
ATTY'S

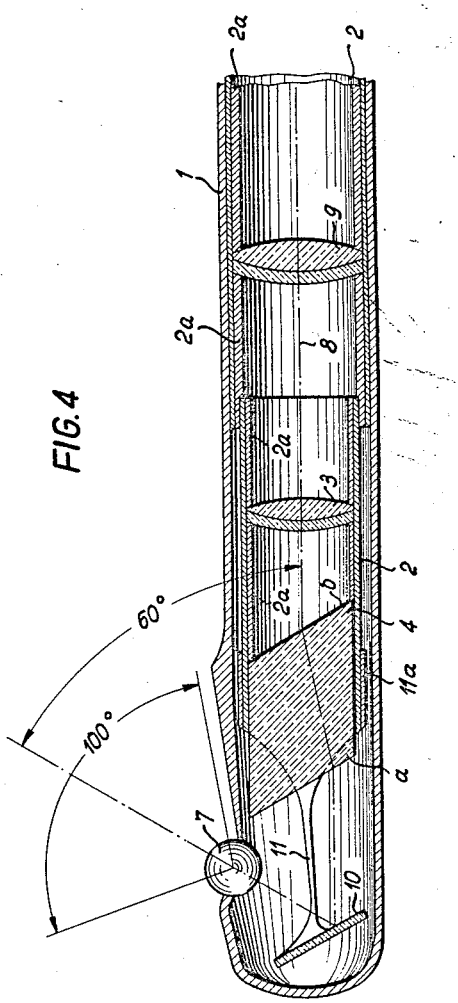

United States Patent Office 2,927,574
Patented Mar. 8, 1960

2,927,574

ENDOSCOPE FOR THE OBSERVATION OF VENTRICLES OF THE BODY OR THE LIKE

Erwin Scholz, Knittlingen, Wurttemberg, Germany, assignor to Richard Wolf, Knittlingen, Wurttemberg, Germany Application May 16, 1955, Serial No. 508,760

Claims priority, application Germany May 28, 1954

5 Claims. (Cl. 128—6)

This invention relates to an endoscope for the viewing and examination of ventricles of the body, narrow bores in workpieces and the like.

In endoscopes known to the art the angle of picture of the optic system provided with objective lenses of the customary type is a very limited one. These customary objective lenses further have the drawback that only an unsatisfactory clearness of picture can be obtained with them, particularly in case of inspections or examinations in liquid media, for example in cases where the endoscope is used as cystoscope.

The invention provides a considerably larger angle of picture than has been obtained so far by endoscopes of the known type. The invention resides particularly in the feature that as objective for the observation optics a ball-objective is employed through the center of which the center ray of the optic system passes and whose diameter is either equal to, or smaller, or larger than the diameter of the optic tube. In an instrument like this, the illuminating means may be arranged separately of the optics on a lamp-support of known construction. Thus the possibility exists of selecting the diameter of the ball-objective either equal to or larger than the diameter of the optic tube. In the first case, at considerable brightness of picture, a very large angle of picture up to 160 degrees can be obtained, and in the second case, depending upon the ratio of diameter, an angle of picture up to approximately 300 degrees is obtained. It is important that for observations in liquids, for example with systoscopes, the use of a ball-objective will produce greatest clearness of picture. Furthermore, when for observations in liquids a ball-objective is used, the angle of picture will collapse much less with respect to air, than when objectives of the known kind are employed.

When, in known manner, the optic tube terminates in straight-lined and offset fashion in a lamp and appertaining mounting for the latter, of smaller diameter than the optic tube, and when the offset shoulder forms the outlook location of the optics, the ball-objective of the invention is mounted in that offset shoulder of the optic tube and so arranged before a deflecting prism that the trace of the center ray passes through the center of the ball-objective.

The ball-objective of the invention can be easily mechanically arranged in the instrument. It is merely necessary that the center ray of the optics passes, preferably via a prism or the like arranged before the lenses, exactly through the center of the ball-objective. In addition to a simple and perfect mounting, ball-objectives have the advantage that they ensure an absolute purity of color and considerable clearness of picture. The angle of picture of the objective is limited fundamentally only by the setting of the ball-objective.

Additional features and advantages of the invention will be understood from a consideration of the following detailed description taken in connection with the accompanying drawings, forming a part of this specification and in which several embodiments of the invention have been shown by way of example. The invention is not confined to any strict conformity with the showing of the drawings, but may be changed or modified, so long as such changes or modifications mark no material departure from the salient features of the invention as expressed in the appending claims.

In the drawings, in which like parts are referred to by the same reference numerals in all of the several figures, Fig. 1 is a longitudinal fractional view, partly in section, of the instrument of the invention;

Fig. 2 is a modified form of construction of the instrument of Fig. 1, in which the entering and exit surfaces of the prism extend parallel to each other;

Fig. 3 is a detail view of a modified form of construction in which the illumination is effected by a separately arranged lamp;

Fig. 4 is a longitudinal fractional view, partly in section, of an instrument devised for retroceding direction of look.

In the embodiment illustrated in Fig. 1, the instrument for the inspection and examination of ventricles of the body or the like consists of an optic tube 1 having arranged in its interior a system tube 2. Within the system tube 2 the several lenses of the optic system are secured in spaced relation preferably by means of tubes 2a interposed between them. The optic system terminates in a rear lens 3 which may be an achromatic lens, and arranged in the system tube before this rear lens 3 is a prism 4 having its entering and exit surfaces a and b inclined toward the axis of the optic tube 1 in the same direction, but differently. Through suitable selection of the inclination of the surfaces a and b the direction of look can be changed within certain limits, as indicated in full lines, broken lines, and dot-and-dash lines, so that, if desired, in the field of vision the portions of the ventricle can be viewed which are more or less removed from the illuminating lamp 5.

In the embodiment of Fig. 1 the optic tube 1 is provided at its free end with a straight-lined tubular extension 1a of smaller diameter in which the lamp 5 is arranged, to which current is supplied via the line 6 passing between the optic tube 1 and the system tube 2 to the end where the eyepiece is positioned. The tubular extension 1a of smaller diameter is on one side flush with the outer circumference of the optic tube 1 and terminates on the opposite side in an offset portion. This offset portion is utilized as outlook location for the optic system. According to the invention, a ball-objective 7 is arranged here in such manner that the center ray 8 of the optic system passes, after deflection by the prism 4, exactly through the center of the ball-objective 7. The ball-lens 7 is secured in position on one side by the edge of the optic tube 1 and on the other side by the edge of the offset end of the tubuler extension 1a, as well as by a circumferential rim of the ball 7. In order to facilitate the provision of the ball with the rim, it is possible to provide the ball with a circumferentially extending slightly flattened surface portion, which flattened portion can then be provided with the rim or setting for the mounting of the lens. But it is also possible to fasten the ball in position through cementing in a bore of the offset portion.

The use of a ball-objective makes it possible to obtain within certain limits for desired directions of look a very large angle of picture at remarkable clearness, particularly also with respect to a liquid, for example water, as outer medium. In the embodiment of Fig. 1, this angle of picture may range up to 110 degrees. Furthermore, the ball-objective has the advantage that an absolute purity of colors is obtained, and that no distortion of the picture occurs as long as the center ray passes exactly through the center of the ball-objective.

A combination of the prism 4 and rear lens 3 is likewise possible when instead of the inclined surface *b* of the prism a convex surface is ground onto the prism at the same angle. However, the manufacture of a combination like this is more difficult and expensive than the separate arrangement of the prism 4 and rear lens 3 because of the inclined position and the required very flat convexity. It is important, if the angular position of the surfaces *a* and *b* and the length of the prism are changed, that the three optic elements 3, 4 and 7 are under all circumstances arranged at accurately adjusted distances from each other, particularly the ball-objective from the prism, in order that the rays pass precisely through the center of the ball-objective.

In the embodiment of Fig. 2 the entering and exit surfaces *a* and *b* of the prism 4 are positioned parallel to each other and inclined toward the axis of the optic tube 1 at a suitable angle, whereby a straight-lined outlook through the ball-objective 7 is obtained.

Fig. 3 shows a modified form of construction in which the illumination is effected by a lamp arranged separately of the optic tube, for example by a lamp mounted in known manner on a lamp support. In this case the deflecting prism 4 and the rear lens 3 are omitted, and the optic system terminates at the ball-objective 7 whose diameter approximately corresponds to the diameter of the optic tube 1. Here, the angle of picture which can be obtained is a comparatively large one and may come up to 150 or 160 degrees.

In the forms of construction of Figs. 2 and 3 the advantage of clearness of picture is likewise achieved, particularly for observations in liquid media, and also in these cases the angle of picture will collapse to a lesser degree than in known objectives.

It should further be mentioned that the diameter of the ball-objective may also be of larger size than the diameter of the optic tube, which may be of particular advantage for the examination of large-sized ventricles of the body, whereby it is possible to reach an angle of picture up to about 300 degrees.

Fig. 4 is a longitudinal sectional view of the free end of an optic system with retroceding direction of look. According to this embodiment the optic system with retroceding direction of look (intended for example for use in gastroscopes) consists of a cover tube 1 and a system tube 2. Within the system tube 2 the several lenses of the optic system, of which only the achromatic lens 9 has been shown, are secured in properly spaced relation by tubes 2*a* interposed between them. Arranged before an achromatic rear lens 3 is a glass plate 4 having two parallel surfaces inclined from the outlook toward the rear lens, and which deflects the centenary 8 parallel to the side turned away from the outlook. Positioned before the glass plate 4 is an optic element 10 having its surface coated with a reflecting layer, and which reflects the deflected center ray 8 through the center of a ball-objective 7 arranged in the wall of the cover tube 1 laterally between the optic element 10 provided with the reflecting layer and the deflecting glass plate 4. The system tube 2 of the optic system has its free end, in which the rear lens 3 and the glass plate 4 are arranged, reduced in diameter, that is to say, offset to a smaller diameter. This reduction in diameter of the free end of the system tube 2 is necessary in order to provide the space needed to connect the element 10 coated with the reflecting layer by means of a supporting member 11, 11*a* rigidly with the system tube 2 without an enlargement, or at least without a considerable enlargement in width of the cover tube 1. In order to provide sufficient space in downward direction for the accommodation of the element 10, the supporting member 11 is laterally arranged and fastened to the offset portion of the system tube 2 by means of a sleeve 11*a* slipped onto the offset portion, so that the optic system together with the mirror 10 can be pushed as a whole into the cover tube 1. As the ball-objective 7 partly projects into the interior of the cover tube, the mirror 10 must be so arranged that it can freely slip with its upper edge past the inner surface portion of the ball-objective, for which reason it has to be supported at a place turned away from the outlook. This necessitates the deflection of the ray by the glass plate 4, which simultaneously prevents a viewing of the portion of the ball-objective projecting into the interior of the cover tube. The reflecting surface of the mirror is preferably so dimensioned that it controls the entire space between the inner vertex of the ball-objective and the inner wall portion of the cover tube confronting the ball-objective.

The center ray of the optic system deflected by the parallel glass plate toward the side turned away from the outlook hits the optic element 10 provided with the reflecting layer and is (in the embodiment of Fig. 4) reflected by the element 10 in conformity with the inclined position of the latter through the center of the ball-objective 7 at an angle for a direction of look of 60 degrees. Thus the ball-objective enables an angle of picture of about 100 degrees. In the new optic system through the wall of the cover tube and the setting of the ball-objective, merely an area of an angle of about 10 degrees can not be viewed, which angle has its vertex positioned in the center of the ball-objective 7. The thickness of the glass plate, as well as the position of the glass plate, mirror and ball-objective have to be carefully selected with respect to each other, as a fully satisfactory picture can be obtained only when the ray passes exactly through the center of the ball-objective.

According to the invention the inclined glass-plate 4 with the parallel faces can also be arranged between the achromatic lens 9 and the rear lens 3. However, in this case the rear lens 3 has to be reduced in diameter in conformity with the parallel displacement of the center ray and eccentrically arranged in such manner that the deflected parallel center ray of the optic system again passes through the center of the rear lens 3.

What I claim as new and desire to secure by Letters Patent of the United States is:

1. In an endoscope for the observation of ventricles of the body or the like, an optic tube provided with an eye piece; a ball-objective of substantially entirely spherical formation but provided with a narrow symmetrical circumferentially extending flattened surface portion by means of which it is mounted in the wall of said optic tube at the observation end of the latter, said ball-objective being mounted eccentrically with respect to the axis of said optic tube, an optic system positioned within said optic tube between said eye piece and said ball-objective; and refracting means positioned within said optic tube between said optic system and said ball-objective, said optic system and said refracting means being so devised and arranged as to refract the center ray of said optic system through the center of said ball-objective.

2. In an endoscope for the observation of ventricles of the body or the like, an optic tube terminating at its observation end in a straight-lined tubular portion of smaller diameter extending parallel to the axis of the optic tube and having its surface on one side flush with the outer circumference of the optic tube and on the opposite side forming an offset shoulder with the latter; an illuminating lamp mounted in said tubular portion of smaller diameter; a ball-objective of substantially entirely spherical formation but provided with a narrow symmetrical circumferentially extending flattened surface portion by means of which it is mounted in the wall of said offset shoulder; and an optic system including a refracting prism arranged within said optic tube before said ball-objective and so devised and positioned with respect to said ball-objective that the center ray of said optic system will be refracted by said prism to pass through the center of said ball-objective.

3. An endoscope as specified in claim 1, in which said deflecting prism is provided with parallel entering and exit surfaces and so arranged with a rear lens of said optic system before said ball-objective and so devised as to its length and inclination of its entering and exit surfaces that the center ray of the optic system passes through the center of said ball-objective.

4. An endoscope as specified in claim 1, in which said deflecting prism is provided with entering and exit surfaces inclined at different angles toward the axis of said optic system and so arranged with a rear lens of said optic system before said ball-objective and so devised as to its length and inclination of its entering and exit surfaces that the center ray of the optic system passes through the center of the ball-objective.

5. An endoscope as specified in claim 1, in which said deflecting prism is combined with a rear lens of said optic system and so arranged within said optic tube before said ball-objective and so devised and positioned with respect to said ball-objective that the center ray of said optic system passes through the center of said ball-objective, said rear lens being ground onto said deflecting prism.

References Cited in the file of this patent

UNITED STATES PATENTS

| | | |
|---|---|---|
| 849,344 | Wappler | Apr. 2, 1902 |
| 1,001,786 | Wappler | Aug. 29, 1911 |
| 1,453,297 | Wappler | May 1, 1923 |
| 1,680,490 | Wappler | Aug. 14, 1928 |
| 1,680,491 | Wappler et al. | Aug. 14, 1928 |
| 1,826,090 | Phelps | Oct. 6, 1931 |
| 1,881,588 | Horni | Oct. 11, 1932 |